United States Patent
DeSalvo

(10) Patent No.: US 7,613,780 B2
(45) Date of Patent: Nov. 3, 2009

(54) OPTIMIZING CONTENT RETRIEVAL OVER A DATA NETWORK

(75) Inventor: Christopher J. DeSalvo, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 11/156,098

(22) Filed: Jun. 17, 2005

(65) Prior Publication Data

US 2009/0144395 A1 Jun. 4, 2009

(51) Int. Cl.
*G06F 15/16* (2006.01)

(52) U.S. Cl. .................. 709/206; 709/203; 709/227; 709/217; 709/219; 709/247

(58) Field of Classification Search ............... 709/206, 709/203, 227, 219, 217, 247; 711/138
See application file for complete search history.

(56) References Cited

U.S. PATENT DOCUMENTS

| | | | | |
|---|---|---|---|---|
| 6,128,655 A | * | 10/2000 | Fields et al. | 709/219 |
| 6,351,767 B1 | * | 2/2002 | Batchelder et al. | 709/219 |
| 2004/0068579 A1 | * | 4/2004 | Marmigere et al. | 709/242 |
| 2004/0181598 A1 | * | 9/2004 | Paya et al. | 709/227 |
| 2005/0033926 A1 | * | 2/2005 | Dumont | 711/138 |

* cited by examiner

*Primary Examiner*—Ario Etienne
*Assistant Examiner*—Sahera Halim

(57) ABSTRACT

A method is described comprising: receiving a request for content stored on a network site from a data processing device, the request including and address for the content and first version information usable to identify a version of the content previously-downloaded to the data processing device; transmitting a first request to the network site on behalf of the data processing device, the first request including the address of the content but requesting only second version information related to the content, the second version information identifying a current version of the content stored on the network site; comparing the first version information with the second version information to determine whether the current version of the content stored on the data processing device is the latest version; transmitting an indication to the client that the client has the latest version of the content if the first version information matches the second version information; if the first version information does not match the second version information, then transmitting a second request to the network site requesting the latest version of the content and forwarding the latest version of the content to the data processing device.

10 Claims, 6 Drawing Sheets

OPTIMIZING CONTENT RETRIEVAL OVER A DATA NETWORK

TECHNICAL FIELD

This application relates generally to the field of data processing systems, and more particularly to a system and method for optimizing content retrieval by a data processing device over a network.

BACKGROUND

The HyperText Transport Protocol ("HTTP") is the data communication protocol used to retrieve Web pages and other content from servers on the World Wide Web ("the Web"). Given the vast number of individuals who access the Web on a daily basis, HTTP is the most widely used data communication protocol today.

FIG. 1 illustrates an exemplary HTTP-based client-server interaction. The client 110 uses a Web browser 120 such as Microsoft's Internet Explorer or Firefox (an open source browser available from www.mozilla.org) to communicate with remote Web servers 130. In response to a the selection of a hyperlink from within a previously-downloaded Web page or the manual entry of a new uniform resource locator ("URL") identifying a Web page, the browser 120 transmits an HTTP request 101 over the network 140 to the Web server 130. Assuming that the user has not previously downloaded the requested Web page to the client 110, the Web server 130 transmits an HTTP response 102 to the client containing the new Web page.

As illustrated in FIG. 2, the HTTP response 102 typically includes a header portion 201 and a body portion 202. The body portion 202 is used to store the underlying content of the Web page (e.g., text, graphics, animation, etc). By contrast, the header portion 201 contains metadata including, for example, a content length field indicating how many bytes the HTTP body takes up; a last modified date/time field indicating that last time the Web page was modified (in GMT format); and an "ETag" field indicating the current value of the "entity tag" for the requested Web page. The entity tag is a unique ID analogous to a checksum which identifies a particular version of a particular resource (such as a Web page) on the Web.

If the user has previously downloaded a copy of the Web page, then the browser 120 transmits the header data 201 for the Web page with the HTTP request 101. The Web server 130 then compares the header data 201 against the header data for the current version of the Web page. For example, the Web server may compare the value of the ETag field in the header data sent from the client with the value of the ETag field for the current version of the Web page. If the current version is the same as the version transmitted by the client 110, then the Web server should (if it is configured properly) transmit an "HTTP 304" result code in the HTTP response 102 embedded within the response header. For an HTTP 304 result code, The HTTP response 102 does not include the body of the message. Upon receipt of the response, the browser identifies the HTTP 304 result code and displays the current version of the Web page cached within the browser (i.e., the most recent version). Network bandwidth is thereby conserved.

One problem which exists with the foregoing configuration is that many current Web servers do not generate HTTP 304 result codes when they should and, instead, re-transmit the entire Web page to the client 110 even though the client 110 already has a local copy of the Web page. Given that a typical header may be in the range of, e.g., 250 bytes whereas a typical Web page body may be in the range of, e.g., 50 Kbytes, a significant amount of bandwidth is unnecessarily wasted. While this may not be a significant problem for relatively high powered clients coupled to broadband Internet connections (e.g., DSL or corporate T1-based local area networks), it can be a problem for users with relatively low bandwidth connections such as dial-up users and for users of wireless data processing/telephony devices.

Accordingly, what is needed is a more efficient mechanism for downloading Web pages and other types of content on a data network.

SUMMARY

A method is described comprising: receiving a request for content stored on a network site from a data processing device, the request including and address for the content and first version information usable to identify a version of the content previously-downloaded to the data processing device; transmitting a first request to the network site on behalf of the data processing device, the first request including the address of the content but requesting only second version information related to the content, the second version information identifying a current version of the content stored on the network site; comparing the first version information with the second version information to determine whether the current version of the content stored on the data processing device is the latest version; transmitting an indication to the client that the client has the latest version of the content if the first version information matches the second version information; if the first version information does not match the second version information, then transmitting a second request to the network site requesting the latest version of the content and forwarding the latest version of the content to the data processing device.

BRIEF DESCRIPTION OF THE DRAWINGS

A better understanding of optimizing content retrieval over a data network can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
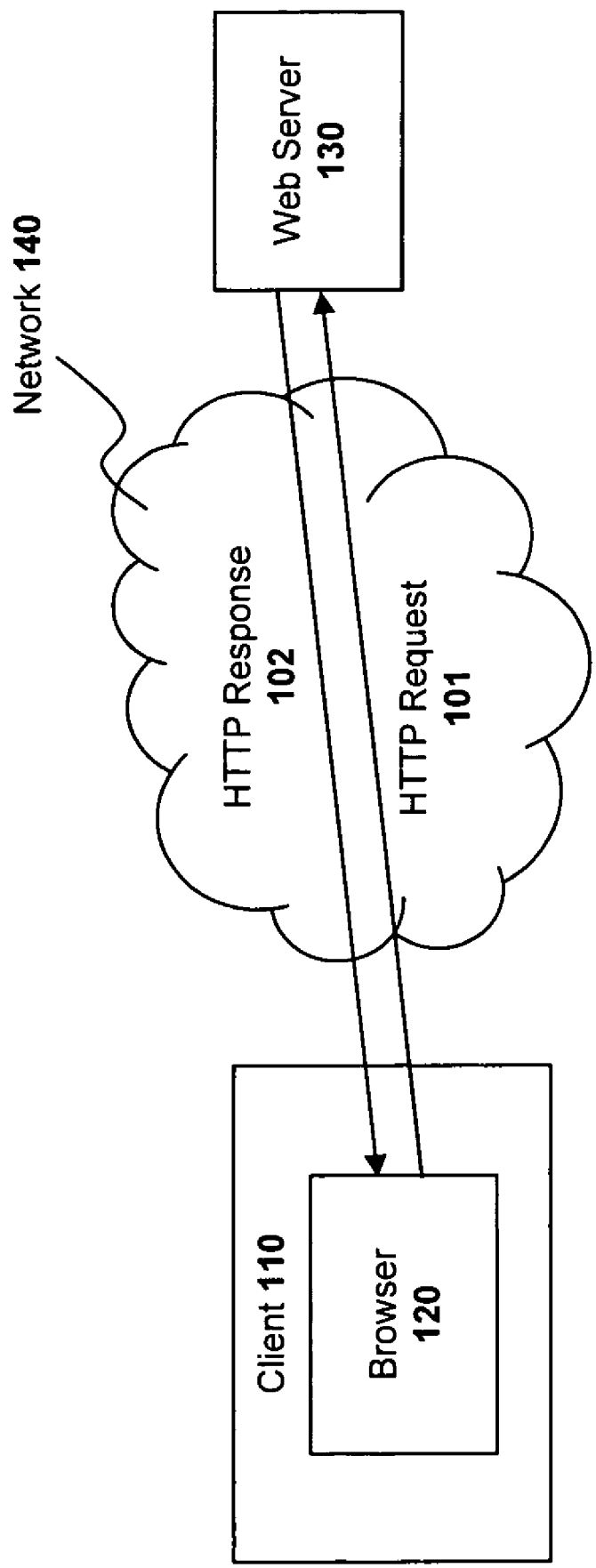
FIG. 1 illustrates an exemplary web server communicating with a client using a request/response protocol.
Figure 2:
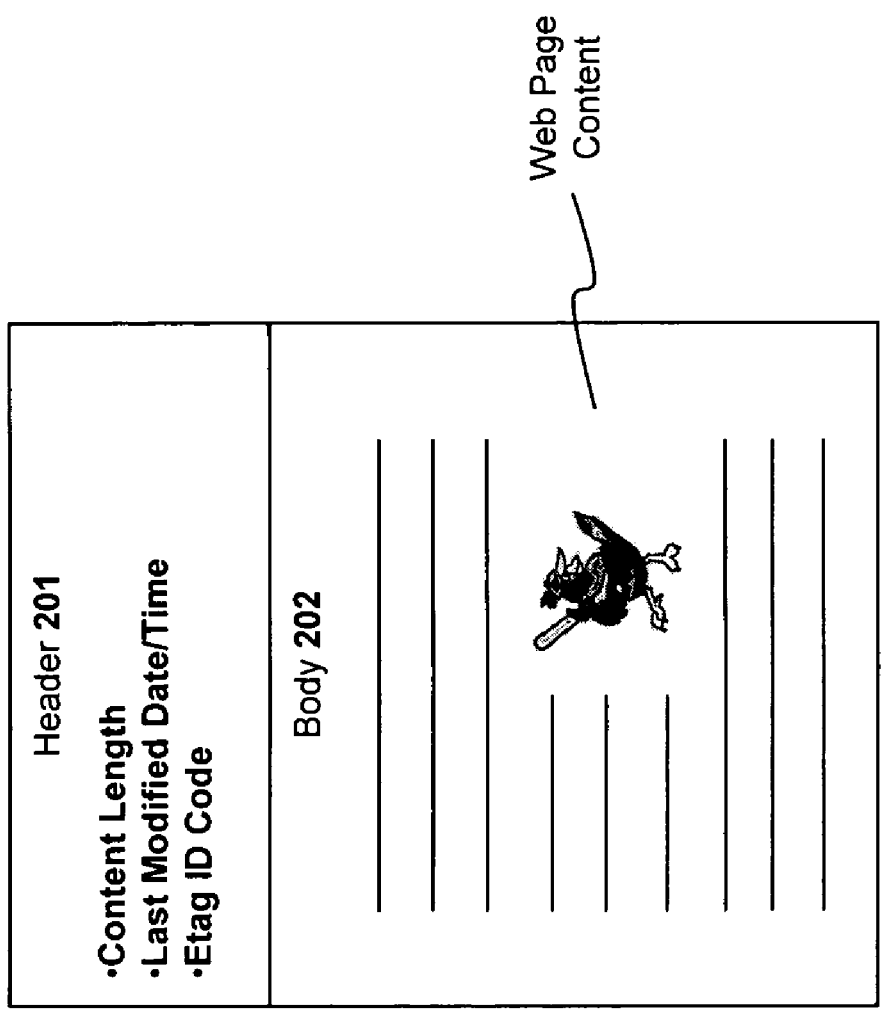
FIG. 2 illustrates one the contents contained within a typical HTTP response.
Figure 3:
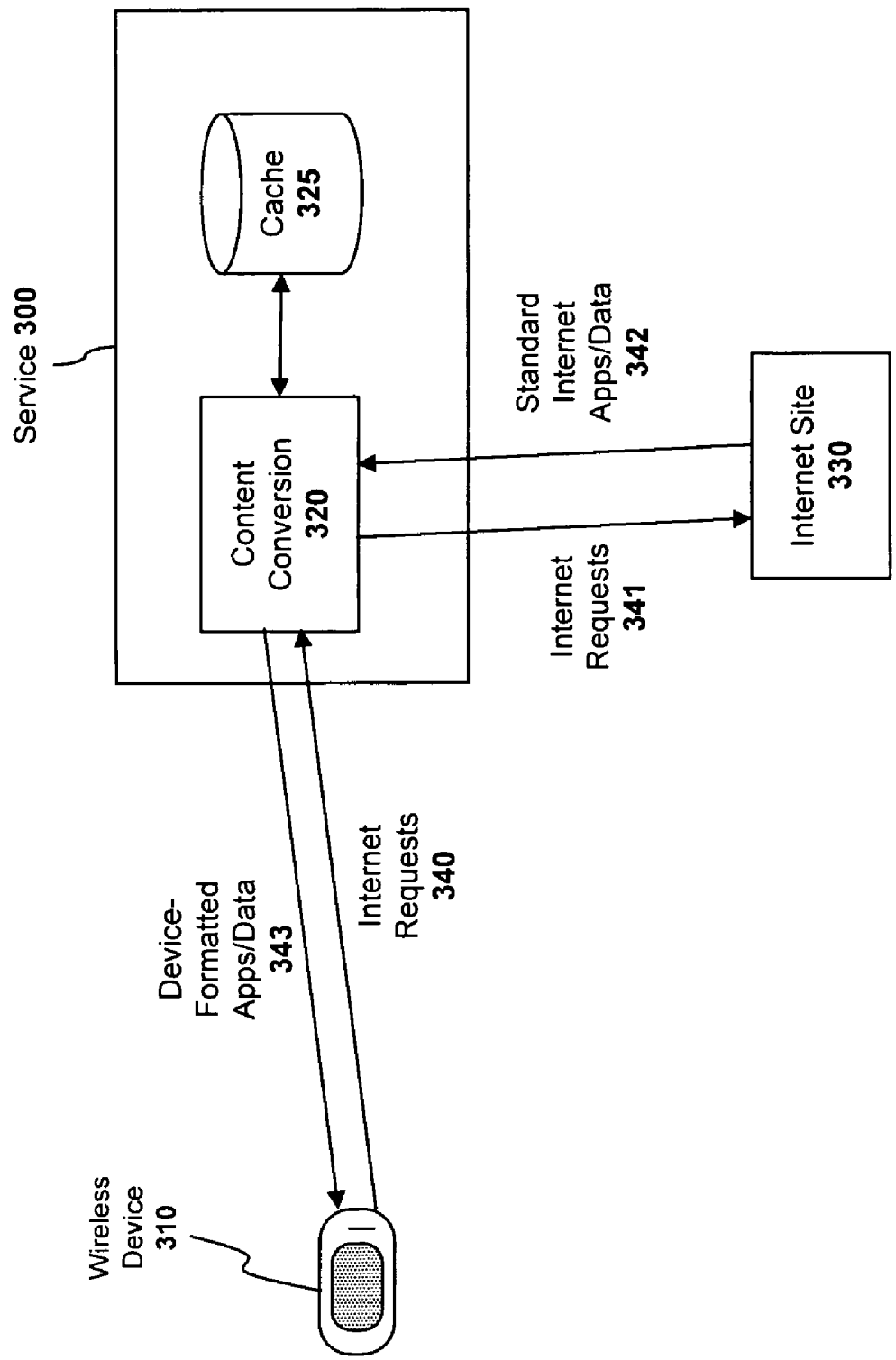
FIG. 3 illustrates a service including a content conversion module coupling a wireless device to the Internet.

Embodiments of the invention may be implemented on a wireless device 110 which communicates with a data processing service 300 as illustrated generally in FIG. 3. Embodiments of a service 300 and data processing device 310 are described in co-pending application entitled NETWORK PORTAL SYSTEM, APPARATUS AND METHOD, Ser. No. 09/714,897, filed Nov. 15, 2000, which are assigned to the assignee of the present application and which are incorporated herein by reference. Certain features of the service 300 will now be described followed a description of the network optimization techniques which are the focus of this application. As an initial matter, however, it should be noted that the specific system architecture and wireless device 310 described in the co-pending application is not required for implementing the underlying principles of the invention. Rather, the embodiments of the invention described below may be implemented on virtually any type of data processing device including, but not limited to, standard personal computers, personal digital assistants and wireless telephones.

In one embodiment, the service 300 converts standard applications and data into a format which each data processing device 310 can properly interpret. Thus, as illustrated in FIG. 3, one embodiment of the service 310 includes content conversion logic 320 for processing requests for Internet content 340. More particularly, the service 300 acts as a proxy for the data processing device 310, forwarding Internet requests 340, 341 to the appropriate Internet site 330 on behalf of the data processing device 310, receiving responses from the Internet site 330 in a standard Internet format (e.g., Web pages with embedded audio/video and graphical content, e-mail messages with attachments, . . . etc), and converting the standard Internet responses 324 into a format which the data processing device 310 can process (e.g., bytecodes as described in the co-pending applications).

For example, the conversion logic 320 may include a hypertext markup language ("HTML") rendering module for interpreting HTML code and downloading any embedded content in the HTML code (e.g., graphics, video, sound, . . . etc) to the service 300. The conversion logic 320 may then combine the HTML code and embedded content and generate a set of bytecodes for accurately reproducing the requested content on the data processing device 310. As described above, in one embodiment, the bytecodes may be Java bytecodes/applets. However, the conversion logic 320 may generate various other types of interpreted and/or non-interpreted code, depending on the particular type of data processing device 310 being used (e.g., one with an interpreter module or one without).

Because one embodiment of the service 300 maintains an intimate knowledge of the capabilities/configuration of each data processing device 310 (e.g., screen size, graphics/audio capabilities, available memory, processing power, user preferences, . . . etc) it can convert/reconstruct the requested Internet content accurately, while at the same time minimizing the bandwidth required to transmit the content to the device 310. For example, the conversion logic 320 may perform pre-scaling and color depth adjustments for images so that they will be rendered properly within the data processing device's 310's display. In making these calculations, the conversion may factor in the memory and processing power available on the data processing device 310. In addition, the conversion logic 320 may compress the requested content using a variety of compression techniques, and thereby preserve network bandwidth.

A System and Method for Optimizing Content Retrieval Over a Data Network

In response to client requests for network content, one embodiment of the invention employs techniques to ensure that the requested content is not retransmitted to the client, if the client already has the latest version of the requested content. The embodiments of the invention below focus on Internet requests using the HTTP protocol. It should be noted, however, that the underlying principles of the invention are not limited to any specific data communication protocol or any particular types of content.

Figure 4:
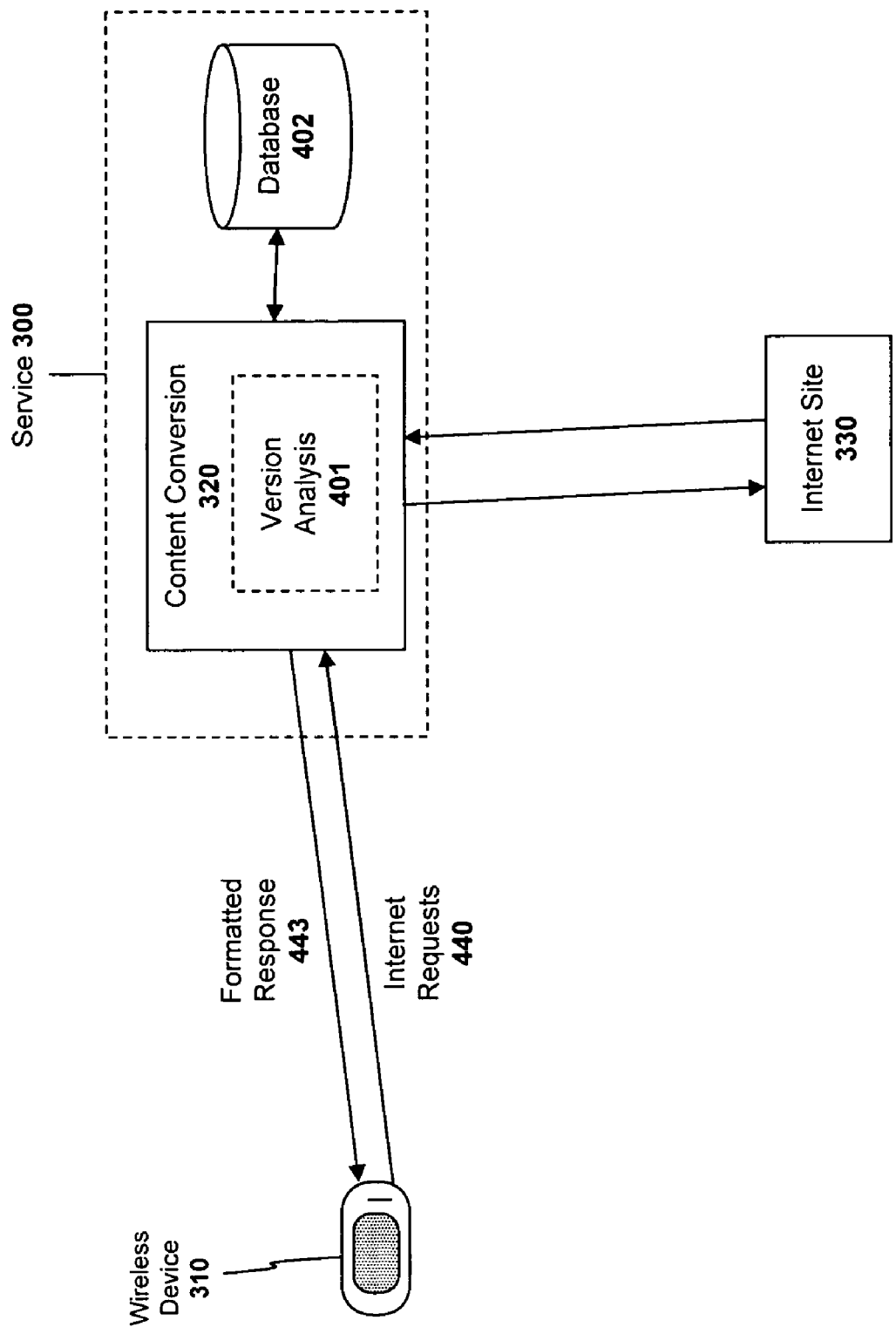
FIG. 4 illustrates a system architecture according to one embodiment of the invention.

FIG. 4 illustrates one embodiment of the invention which includes version analysis module 401 for determining whether the content requested by the client—in this case a wireless device 310—is already stored on the client. To this end, in one embodiment, the version analysis module 401, content conversion module 320 and other logic on the service 300 implement the method illustrated in FIG. 5.

Figure 5:
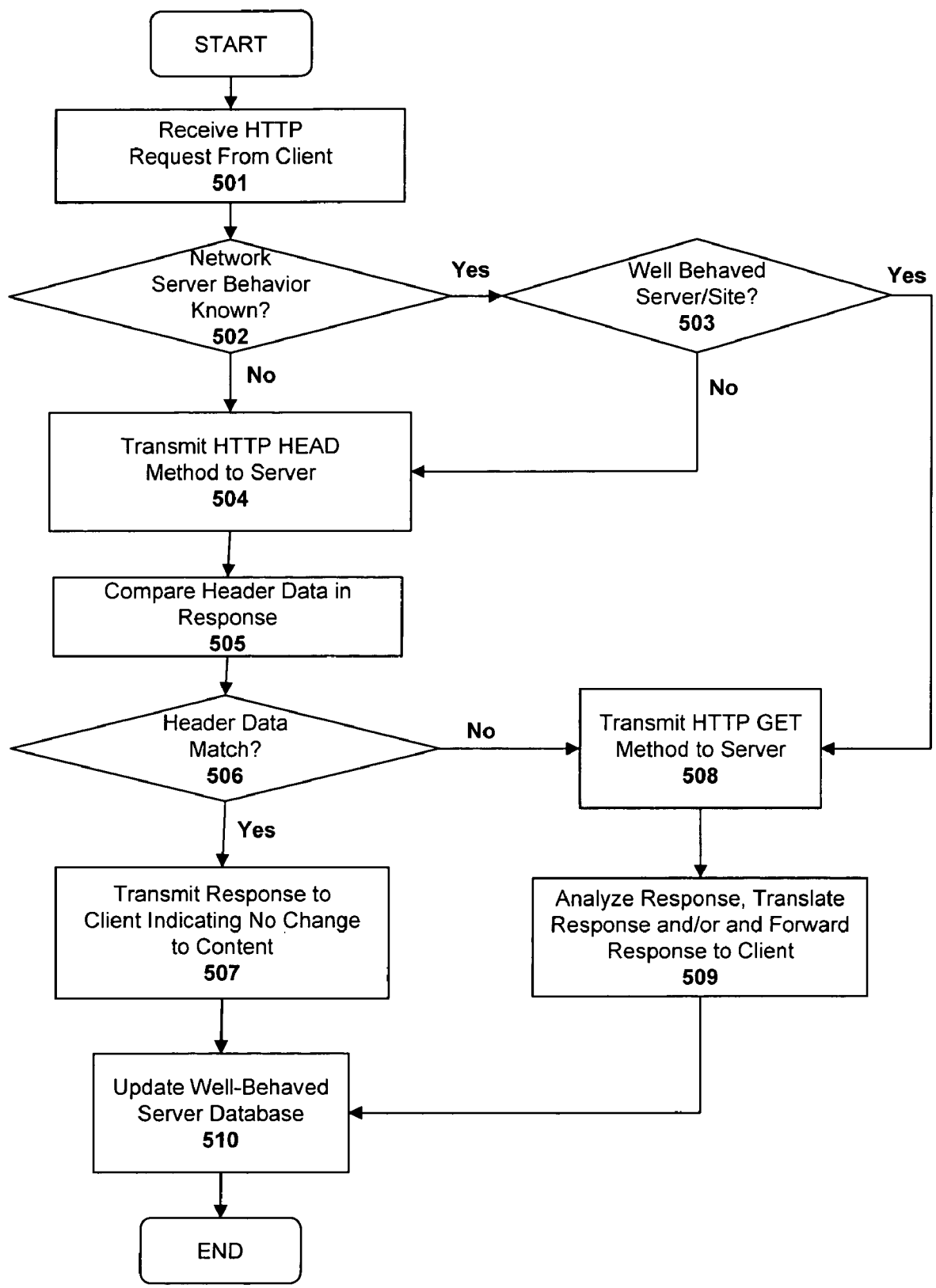
FIG. 5 illustrates a method for optimizing network communication according to one embodiment of the invention.

Turning now to FIG. 5, at 501, the service 300 receives an HTTP request for Internet content from the wireless device 310. At 502, the version analysis module 401 determines whether the behavior of the Internet site 330 from which the wireless devices has requested the content is known. In one embodiment, an up-to-date list of Internet sites and corresponding behaviors is maintained within a database 402 within on the service 300 (and/or cached within random access memory on the service for performance reasons). Each site may be identified by its primary URL (e.g., www.yahoo.com). One behavior in particular which is monitored is whether the Internet site retransmits an entire Web page (header and body) to the client (with an HTTP 100 response code) even though the header data transmitted from the client matches the header data for the current version of the Web page (i.e., rather than returning HTTP 304 result code within a header, as would be appropriate). In this scenario, the Internet site may be identified as a "misbehaving" site whereas internet sites that transmit an HTTP 304 response are identified as "well behaved" sites. The database 402 may be continually updated with new information in response to interactions with different Internet sites.

If the behavior of the internet site is not known, or if the server site is known to be a "misbehaving" site, determined at 503, then at 504, an HTTP "HEAD" request is sent to the server/site. Unlike a standard HTTP GET request that retrieves the complete information identified by the request (e.g., a full Web page), an HTTP HEAD request only retrieves the header data associated with the request. Thus, in the case of a Web page, only the header data is initially downloaded to the service 300.

At 505, after the header data has been downloaded, one embodiment of the invention compares the downloaded header data to the header data associated with the client's request. If certain data fields of the downloaded header data match corresponding fields of the request header data, determined at 506, then it is assumed that the client has the most recent version.

Figure 6:
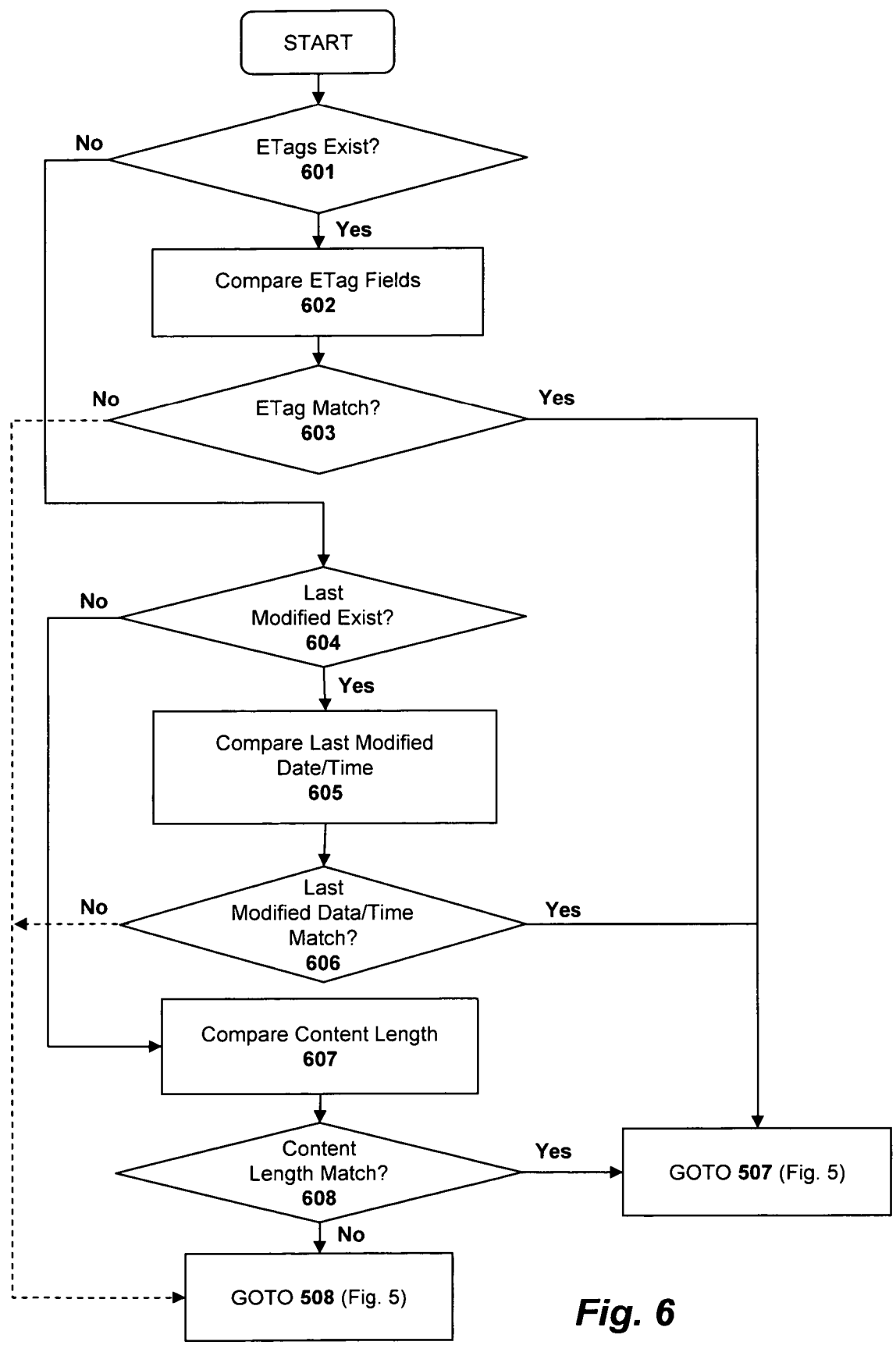
FIG. 6 illustrates a method for comparing header data according to one embodiment of the invention.

One embodiment of a method for determining a match at 506 is illustrated in FIG. 6. Some headers do not include ETags, so an ETag comparison may not be possible. However, if ETags do exist, they uniquely identify the version of the requested content. Accordingly, at 601, a determination is made as to whether ETags exist. if they exist, the ETags of the two headers are compared at 602. If the ETags match, determined at 603, then the process returns to 507 in FIG. 5 and a response is transmitted to the client indicating that the client has the latest version of the requested content (e.g., via an HTTP 304 response). If the ETags do not match, then the process returns to 508 in FIG. 5 (described below).

If the ETags do not exist, determined at 601, then at 604 a determination is made as to whether a last modified date/time exists (certain types of dynamic content do not include the last modified date/time). A comparison is made at 605 and, if the last-modified date/time matches, then the process returns to 507 in FIG. 5 and a response is transmitted to the client indicating that the client has the latest version of the requested content. If the last modified date/time do not match, then the process returns to 508 in FIG. 5 (described below).

If the last-modified date/time does not exist, then at 607, a comparison is made between the content length field contained in the newly-downloaded header and the header transmitted from the client. While it is possible that the content length of different versions of a Web page (or other type of resource) may be the same, it is highly unlikely. Accordingly, if the content lengths match, determined at 608, then the process returns to 507 in FIG. 5 and a response is transmitted to the client indicating that the client has the latest version of the requested content. If, however, the content lengths do not match, then the process returns to 508 in FIG. 5 (described below).

Returning to FIG. 5, if a match is not made through the process outlined in FIG. 6, then the requesting wireless device 310 does not have the latest version of the Web page (or other content). As such, at 508, the service 300 transmits a standard "HTTP GET" method to the Internet site 330 requesting the full Web page. The process may also arrive at 508 if it is determined at 503 that the server is a "well behaved" server.

The Web page is returned to the service and, at 509, may be translated by the content conversion module 320 (e.g., as described above and in the co-pending application). In addition, if the process arrived at 508 via the determination that the server is a "well behaved" server (at 503) the version analysis module 401 may compare the headers to ensure that the server should still be categorized at "well behaved."

Finally, at 510 the database indications of "well behaved" and "misbehaving" servers is updated. For example, if a server identified as a "well behaved" server provides a complete HTTP response (header and body) when the client already has the same version of the requested Web page (instead of sending an HTTP 304 response) then that server may be moved from the "well behaved" category to the "misbehaving" category. Conversely, if a server categorized as "misbehaving" sends an HTTP 304 response instead of the full Web page body, then it may be re-categorized as a "well behaved" server.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above focus primarily on the HTTP protocol, the underlying principles of the invention may be implemented in the context of virtually any request/response protocol in which multiple versions of information may exist. Moreover, the underlying principles of the invention may be implemented within standard personal computer configurations standard wireless telephones, and a variety of other types of communication devices (e.g., vehicle communication devices). Moreover, although the invention was described in the context of specific types of applications and content (e.g., Web pages), the underlying principles of the invention are not limited to any particular content type.

Accordingly, the scope and spirit of the invention should be judged in terms of the claims which follow.

What is claimed is:

1. A method comprising:

receiving an HTTP request for content stored on a remote network site from a data processing device, the request including an address for the content and first version information usable to identify a first version of the content previously transmitted to the data processing device;

determining if the remote network site is operating properly by responding with an HTTP response when the first version of the content is the same as a second version of the content stored at the network site;

if it is determined that the network site is operating improperly by responding with a complete Web page when the first version of the content is the same as the second version of the content stored at the network site, or if it is not known whether the network site is operating properly:

transmitting a first request to the network site on behalf of the data processing device, the first request including the address of the content but requesting only second version information related to the content, the second version information identifying the second version of the content stored on the network site;

comparing the first version information with the second version information to determine whether the first version of the content stored on the data processing device is the same as the second version of the content stored on the remote network site;

transmitting an indication to the data processing device that the data processing device has a current version of the content if the first version information is the same as the second version information;

if the first version information is not the same as the second version information, then transmitting a second request to the network site requesting the second version of the content; and if it is determined that the network site is operating properly, then refraining from said transmitting the first request and instead initially transmitting the second request to the remote network site.

2. The method as in claim 1 wherein the request for content comprises a request for a particular Web page, wherein transmitting the first request to the network site comprises transmitting an HTTP HEAD request for a header of the Web page, the header containing the second version information, and wherein the second request to the network site comprises an HTTP GET request for the entire Web page.

3. The method as in claim 1 wherein operating properly further comprises the network site responding with an HTTP 304 response when the version requested is the same as the version stored at the network site.

4. The method as in claim 1 wherein comparing the first version information to the second version information comprises:
   determining if ETag fields in the first version information and the second version information match if they exist;
   wherein, if no ETags exist, then determining if last modified date/time fields in the first version information and the second version information match if they exist; and
   wherein, if no last modified date/time fields exist, then determining if content length fields in the first version information and the second version information match.

5. A system comprising a memory for storing program code and a processor for processing the program code, the program code causing the processor to perform the operations of:
   receiving an HTTP request for content stored on a network site from a data processing device, the request including and address for the content and first version information usable to identify a version of the content previously downloaded to the data processing device;
   determining if the network site is operating properly by responding with an HTTP response when the first version of the content is the same as a second version of the content stored at the network site;
   if it is determined that the network site is operating improperly by responding with a complete Web page when the first version of the content is the same as the second version of the content stored at the network site, or if it is not known whether the network site is operating properly:
      transmitting a first request to the network site on behalf of the data processing device, the first request including the address of the content but requesting only second version information related to the content, the second version information identifying the second version of the content stored on the network site;
      comparing the first version information with the second version information to determine whether the first version of the content stored on the data processing device is the same as the second version of the content stored on the network site;
      transmitting an indication to the data processing device that the data processing device has a current version of the content if the first version information is the same as the second version information;
      if the first version information is not the same as the second version information, then transmitting a second request to the network site requesting the second version of the content; and
   if it is determined that the network site is operating properly, then refraining from said transmitting the first request and instead initially transmitting the second request to the network site.

6. The system as in claim 5 wherein the request for content comprises a request for a particular Web page, wherein transmitting the first request to the network site comprises transmitting an HTTP HEAD request for a header of the Web page, the header containing the second version information, and wherein the second request to the network site comprises an HTTP GET request for the entire Web page.

7. The system as in claim 5 wherein comparing the first version information to the second version information comprises:
   determining if ETag fields in the first version information and the second version information match if they exist;
   wherein, if no ETags exist, then determining if last modified date/time fields in the first version information and the second version information match if they exist; and
   wherein, if no last modified date/time fields exist, then determining if content length fields in the first version information and the second version information match.

8. A machine-readable storage medium having program code stored thereon which, when executed by a processor, causes the processor to perform the operations of:
   receiving a request for content stored on a network site from a data processing device, the request including and address for the content and first version information usable to identify a version of the content previously-downloaded to the data processing device;
   determining if the remote site is operating properly by responding with an HTTP response when the first version of the content is the same as a second version of the content stored at the network site;
   if it is determined that the network site is operating improperly by responding with a complete Web page when the first version of the content is the same as the second version of the content stored at the network site, or if it is not known whether the network site is operating properly:
      transmitting a first request to the network site on behalf of the data processing device, the first request including the address of the content but requesting only second version information related to the content, the second version information identifying the second version of the content stored on the network site;
      comparing the first version information with the second version information to determine whether the first version of the content stored on the data processing device is the same as the second version of the content stored on the network site;
      transmitting an indication to the data processing device that the data processing device has a current version of the content if the first version information is the same as the second version information;
      if the first version information is not the same as the second version information, then transmitting a second request to the network site requesting the second version of the content; and
   if it is determined that the network site is operating properly, then refraining from said transmitting the first request and instead initially transmitting the second request to the remote network site.

9. The machine-readable storage medium as in claim 8 wherein the request for content comprises a request for a particular Web page, wherein transmitting the first request to the network site comprises transmitting an HTTP HEAD request for a header of the Web page, the header containing the second version information, and wherein the second request to the network site comprises an HTTP GET request for the entire Web page.

10. The machine-readable storage medium as in claim 8 wherein comparing the first version information to the second version information comprises:

determining if ETag fields in the first version information and the second version information match if they exist;

wherein, if no ETags exist, then determining if last modified date/time fields in the first version information and the second version information match if they exist; and wherein, if no last modified date/time fields exist, then determining if content length fields in the first version information and the second version information match.

* * * * *